United States Patent
Bloemer

[15] 3,672,402
[45] June 27, 1972

[54] AUTOMATIC PRECHARGE ADJUSTER

[72] Inventor: John W. Bloemer, Mentor, Ohio
[73] Assignee: Eaton Yale & Towne, Inc., Cleveland, Ohio
[22] Filed: Sept. 14, 1970
[21] Appl. No.: 71,947

[52] U.S. Cl. ................................138/31, 91/165, 91/417, 98/134
[51] Int. Cl. ...........................................F16l 55/04
[58] Field of Search ..............................138/26–31; 91/165, 91/417; 92/134

[56] References Cited

UNITED STATES PATENTS

| | | | |
|---|---|---|---|
| 1,663,647 | 3/1928 | Brush | 138/31 |
| 1,952,916 | 3/1934 | Etten | 138/31 |
| 2,099,368 | 11/1937 | Levy | 92/134 |
| 2,815,008 | 12/1957 | Hirt | 92/134 |
| 2,875,786 | 3/1959 | Shelly | 138/30 |

Primary Examiner—Houston S. Bell, Jr.
Attorney—Teagno & Toddy

[57] ABSTRACT

An automatic precharge gas pressure adjuster for a hydraulic desurger for automatically adjusting the precharge gas pressure in response to operating changes in system fluid pressure thereby maintaining a constant volume of precharge gas in the desurger. The adjusting unit comprises a cylinder divided into two chambers by a spring-biased differential-area piston. The system fluid pressure communicates with the chamber facing the first or largest area piston face while precharge gas communicates with the chamber facing the second or smallest area piston face. To assure the precharge gas pressure will be adjusted for changes in system operating pressure only, and not for mere surges, snubbing restrictions are placed in the means connecting the hydraulic system with the precharge gas adjusting unit.

8 Claims, 2 Drawing Figures

PATENTED JUN 27 1972   3,672,402

INVENTOR.
JOHN W. BLOEMER

ATTORNEYS

AUTOMATIC PRECHARGE ADJUSTER

BACKGROUND OF THE INVENTION

This invention relates to automatic precharge gas pressure control devices for hydraulic desurgers, accumulators or the like, and more particularly to an automatic precharge gas pressure adjusting unit utilizing a spring-biased piston having two faces of different area hereinafter referred to as a differential area piston.

Hydraulic desurgers and accumulators, to be operable in a system with variable operating pressure levels, require means for adjusting the precharge gas pressure to maintain a substantially constant volume of precharge gas in the desurger or accumulator.

A substantially constant precharge gas volume is required to enable the desurger or accumulator to compensate for pressure surges and prevent damage to the desurger or accumulator bladder or accumulator piston as the case may be. Ideally this adjustment will be automatically made requiring no external adjustment or manual supervision. To assure that adjustments occur only when system operating pressure changes and not at mere surges this and earlier adjusting units utilize snubbing restrictions in the connection between the adjusting unit and the hydraulic system.

Earlier automatic precharge adjusting units have utilized equal area pistons. A major problem of the equal area piston devices was if the flow rates to both sides of the piston were not properly balanced or controlled the precharged gas volume in the desurger would drastically change with changes in system pressure and would not return to optimum operating volume when equilibrium was finally reached. Also, if the aforementioned snubbing restrictions become blocked the precharge gas volume in the desurger would drastically change with changes in system pressure and would not return to optimum operating volume when the restrictions became unblocked. The present invention utilizes a spring-biased, differential-area piston which will return the precharged gas volume to an optimum operating level when equilibrium is reached or the snubbing restrictions become unblocked.

An object of this invention is to provide an improved hydraulic desurger or the like.

A further object of this invention is to provide an improved automatic precharge gas adjuster in which the precharge gas volume of a desurger or accumulator will be maintained at a substantially constant level by the use of a spring-biased differential-area piston.

These and other objects and advantages of the present invention will become apparent from the specification read in conjunction with the drawings.

BRIEF SUMMARY OF THE INVENTION

This invention relates to an automatic precharge gas pressure adjuster for a hydraulic desurger, accumulator or the like. The automatic precharge adjuster will increase or decrease the precharge gas pressure in response to increases or decreases respectively in system operating pressures thereby maintaining a substantially constant volume of gas in the precharge section of the desurger.

The precharge adjuster generally comprises a cylinder divided into two chambers by a spring-biased differential-area piston. Snubbing restrictions are placed between the system and both chambers to assure the precharge pressure will be adjusted to changes in operating pressure only, and not in response to mere system surges. The first of said chambers is faced by the first or largest area piston face and is in fluid communication with the system pressure. The second of said chambers is faced by the second or smallest area piston face and communicates with and controls the volume and pressure of the precharged gas. The piston is spring biased in the direction towards the largest area piston face. The use of a spring-biased differential-area piston permits automatic correction of the desurger's precharge gas volume, as well as precharge gas pressure irrespective of the relative flow rates through the two snubbing restrictions.

DETAILED DESCRIPTION OF THE INVENTION

Figure 1:
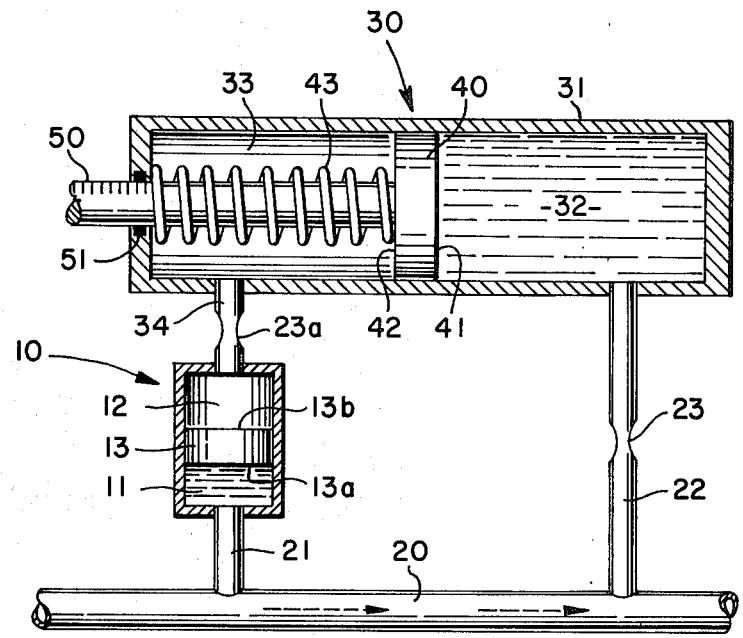
FIG. 1 A schematic illustration of the invention as utilized with a hydraulic piston accumulator.

Referring to FIG. 1 in which a schematic illustration of one form of the invention will be seen, the accumulator unit is indicated generally at 10. The accumulator illustrated is divided into a lower fluid chamber 11 and an upper precharge gas chamber 12 by movable piston 13. It should be noted that the area of lower face 13a of the piston is essentially equal to the area of upper face 13b.

Figure 2:
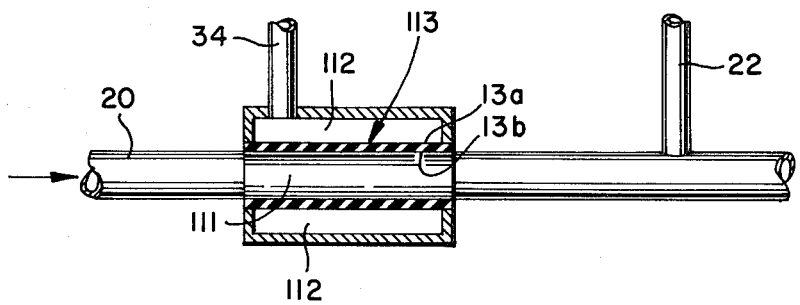
FIG. 2 A partial schematic illustrating an embodiment of the invention as utilized with a hydraulic desurger.

In those applications utilizing a hydraulic desurger 110, as seen in FIG. 2, the movable member 113 will be a bladder made of rubber or a like suitable material. The desurger is divided into a fluid chamber 111 and a precharge gas chamber 112 by the bladder 113. The exterior surface area 113a of bladder 113 exposed to precharge gas pressure is substantially equal to interior surface area 113b exposed to fluid or system pressure. As the remainder of the system structure and operation is identical for both accumulator and desurger applications only the accumulator application will be described in detail.

Referring again to FIG. 1, lower chamber 11 communicates with the hydraulic system 20 through conduit 21. The hydraulic system 20 also communicates through conduit 22 and snubbing restriction 23 with the automatic precharge pressure control unit 30. The pressure control unit 30 comprises a generally cylindrical member 31 divided by differential area piston 40 into a first chamber 32 and a second chamber 33. Chamber 33 communicates with upper precharge gas chamber 12 of the desurger 10 through conduit 34 and snubbing restriction 23a.

Differential area piston 40 has a first face 41 which is larger in surface area than its second face 42. Piston face 41 is exposed to the pressure in chamber 32 while piston face 42 is exposed to the pressure in chamber 33. The piston is resiliently biased to the right by spring 43.

Lower chamber 11 and lower face 13a of accumulator piston 13 are exposed to system pressure. First face 41 of differential area piston 40 and chamber 32 are exposed to system operating pressure.

Upper chamber 12 and upper face 13b of accumulator piston 13 are exposed to precharge gas pressure as are second face 42 of differential area piston 40 and chamber 33.

At balanced conditions, the precharge gas pressure in chamber 12 will equal the system fluid pressure in chamber 11 as faces 13a and 13b of piston 13 are of equal area. Also, at balanced conditions, the fluid pressure in chamber 32 will equal the precharge gas pressure in chamber 33 as the system fluid pressure in chamber 11 equals the system operating fluid pressure in chamber 32 at balanced conditions. Thus to maintain differential area piston 40 in a fixed position, the combined force of spring 43 and precharge gas pressure acting on face 42 must equal the force of system fluid pressure acting on face 41.

The formulas involved are:
$$F_{pressure} = P \times A \text{ and}$$
$$F_{spring} = K \times \Delta L$$

Where
$F_{pressure}$ = force due to pressure
$F_{spring}$ = force due to spring
$P$ = magnitude of pressure
$A$ = area acted on by pressure
$K$ = spring constant
$\Delta L$ = deflection of spring from neutral position Thus, at balanced conditions
$$F_{system\ operating\ pressure} = F_{precharge\ gas\ pressure} + F_{spring\ 43}$$
$$P_{32} \times A_{41} = P_{33} \times A_{42} + K_{43} \times \Delta L_{43}$$
$$P_{32} = P_{33}$$

Therefore:
$$(P_{32} \times A_{41}) - (P_{32} \times A_{42}) = K_{43} \times \Delta L_{43}$$

$$P_{32}(A_{41} - A_{42}) = K_{43} \times L_{43}$$
$$P_{32} = K_{43} \times \Delta L_{43}/(A_{41} - A_{42})$$

It can be seen for any given range of system operating pressures a suitable spring and/or differential area piston may be selected to give optimum operating conditions.

Attached to the piston 40 may be stem 50 which protrudes through the precharge pressure control unit cylindrical member 41 at a gas tight packing 51. The stem may carry indicia of relative or absolute pressure and thus may provide an external visual indication of system operating pressure. Of course the stem 50 may also cooperate with the various types of limit switches (not shown) which will shut down the system or activate an alarm (not shown) when a pressure greater or less than a predetermined maximum or minimum pressure respectively is experienced.

The operation of the automatic precharge adjuster 30 will now be discussed describing an increase in system operating pressure only. However it will be understood that the adjuster will operate similarly in the event of a decrease in operating pressure. In other words the principal of operation is the same for both increases and decreases in system operating pressure. As the fluid pressure in hydraulic system 20 increases the pressure in chambers 11 and 32 and upon piston faces 13a and 41 will also increase. The piston 13 will move upward compressing the gas in chambers 12 and 33 until it equals the pressure of the system and thus the pressure and resulting forces on faces 13a and 13b will be equal.

The increased system pressure will also cause piston 40 to move to the left until the increased force from spring 43 caused by increased $\Delta L$ equals the force of the increased pressure on the amount of area by which piston face 41 exceeds face 42, or $A_{41} - A_{42}$. This leftward motion of piston 40 will return piston 13 to substantially its original position due to the fact that faces 13a and 13b are at equal pressure and constant precharge volume in the desurger will be maintained.

It will be seen that for any given system pressure within the established operating range of the desurger, the piston 40 will assume one and only one position. At such position the force of system operating pressure acting upon face 41, namely $P_{32} \times A_{41}$, equals the sum of the force from spring 43, namely $K_{43} \times \Delta L_{43}$, and the force of precharge gas pressure acting upon face 42, namely $P_{33} \times A_{42}$. Thus, by proper selection of the cylinder 31, differential area piston 40 and spring 43 a substantially constant precharge volume may be maintained in the precharge chamber 12 of accumulator 10.

The above constant precharge gas volume characteristic is not true of an equal area unbiased piston which will maintain any position it happens to be in when an equal pressure is experienced on each of its equal faces. If that position is offset greatly to the right or the left as may occur when either of the snubbing restrictions 23 or 23a is temporarily blocked or the relative flow rates through the two snubbers is not properly balanced during a change in system pressure, the accumulator piston 13 or desurger bladder member 113 may be bottomed or topped in its cylinder rendering it unable to absorb system surges and possibly causing damage to the bladder member.

In the event of a surge, snubbing restrictions 23 and 23a will prevent chambers 32 and 33 from feeling the surge pressure and piston 13 will move upward absorbing the surge. The system will return to its set position as the surge passes and the pressure once again equalizes at a balanced level.

It will be apparent that while applicant's system of automatic precharge gas pressure adjustment is particularly well adapted for accumulators and desurgers of the type shown, it can likewise be applied to all types of desurgers or accumulators wherein it is desired to adjust precharge gas pressure to equal system pressure while maintaining a constant precharge gas volume.

Having thus described my invention, what I claim is:

1. A control device for maintaining a substantially constant volume of precharge gas in a hydraulic device having two sections, the first of which is in communication with a variably pressurized hydraulic system and the second of which is filled with precharge gas at substantially the same pressure as the hydraulic system, said control device comprising:
   a piston having first and second opposed faces, said first face of greater surface area than said second face;
   a cylinder in which said piston is slidably and sealingly engaged, said piston dividing said cylinder into a first and second chamber faced by said first and second faces respectively, said first chamber exposed to hydraulic system pressure, said second chamber in communication with said second section and forming a closed variable volume precharge gas containing cavity therewith whereby changes in second chamber volume result in proportionally inverse changes in precharge gas pressure, and
   means biasing said piston towards said first chamber.

2. The control device of claim 1 wherein said hydraulic device is a hydraulic desurger.

3. The control device of claim 1 wherein said hydraulic device is a hydraulic accumulator.

4. The control device of claim 1 wherein said biasing means is a spring, the spring constant of said spring being such as to supply a force opposed and substantially equal to that force supplied by hydraulic system pressure, within the expected operating ranges, acting on that amount of surface area by which the first face is greater than the second face.

5. The device of claim 4 wherein said piston carries a stem variably extending from said cylinder in response to movements of said piston.

6. The automatic precharge adjuster of claim 4 wherein the operating characteristics of said desurger may be varied by varying the spring constant of said spring biasing means.

7. The device of claim 5 wherein said stem carries visual idica of system pressure.

8. The control device of claim 4 additionally comprising means communicating said first chamber with said hydraulic system, said communication means having a snubbing restriction between said first chamber and said hydraulic system.

* * * * *